United States Patent [19]

Browder

[11] Patent Number: 4,677,502
[45] Date of Patent: Jun. 30, 1987

[54] TURNAROUND TAPE TRANSPORT APPARATUS WITH COMPENSATION FOR HEAD-TO-TAPE STICK-SLIP ACTION

[75] Inventor: Lewis B. Browder, Carpinteria, Calif.
[73] Assignee: Datatape, Incorporated, Pasadena, Calif.
[21] Appl. No.: 879,737
[22] Filed: Jun. 27, 1986
[51] Int. Cl.⁴ .............................................. G11B 15/54
[52] U.S. Cl. ....................................................... 360/73
[58] Field of Search .......................................... 360/73
[56] References Cited

U.S. PATENT DOCUMENTS 3,497,158 2/1970 Calaway ............................. 242/190
4,091,979 5/1978 Browder ................................. 226/7

Primary Examiner—George G. Stellar
Attorney, Agent, or Firm—Dennis P. Monteith

[57] ABSTRACT

Tape flutter, caused by head-to-tape stick-slip action, is suppressed in tape transport apparatus of the turnaround type having a single, speed-regulated capstan for metering magnetic tape into and out of a magnetic transducer station. To that end, a low-inertia motor, coupled to a turnaround roller, includes a tachometer for monitoring the instantaneous speed of the roller, and thereby the speed of the capstan tape loop. A phase lock loop, coupled to the tachometer, produces a composite signal including a nominal component corresponding to a desired tape speed, and an error component corresponding to tape flutter in the capstan loop. A bandpass filter, coupling the output of the phase lock loop and the motor, causes the motor to adjust the speed of the turnaround roller in phase opposition to the error component, to thereby suppress flutter in the capstan tape loop.

6 Claims, 3 Drawing Figures

TURNAROUND TAPE TRANSPORT APPARATUS WITH COMPENSATION FOR HEAD-TO-TAPE STICK-SLIP ACTION

BACKGROUND OF THE INVENTION

1. Field of the Invention

The present invention relates generally to magnetic tape transport apparatus. More particularly, the invention relates to compensation for head-to-tape stick-slip action in transport apparatus of the type having a single, speed-regulated capstan for metering magnetic tape into and out of a magnetic transducer station.

2. Description Relative to the Prior Art

There is known in the prior art magnetic tape transport apparatus of the type having a single, speed-regulated capstan that serves for metering magnetic tape into and out of a magnetic head transducer station. For this to be accomplished with a single capstan drive, a turnaround roller serves to effect a 180-degree change in the direction of the magnetic tape after the capstan initially feeds the tape through the transducer station for a recording operation. After the direction of tape is reversed, the capstan then pulls the tape back through the transducer station for a playback operation.

The transducer station and the turnaround roller, with the two tape spans therebetween, constitute a resonant system. With the inertia of the turnaround roller being excited by a stick-slip action of the tape as it is drawn over a magnetic head, the flexible magnetic tape can resonate at oscillation frequencies in the range of 350 hertz (Hz). These frequencies fall within the flutter compensation range required of a modern magnetic tape recorder.

In the prior art, rotary damped vibration absorbers have proven only partially successful in reducing the turnaround roller inertia. Furthermore, vibration absorbers introduce phase distortion which adversely affects servomechanism control of the capstan.

Separate motors, servo controlled from the same source, have driven the capstan and turnaround roller. This has proven to be very expensive and requires an exact match between the respective diameters of the capstan and roller. Unequal circumferences generate excess tension on one side or the other of the tape loop, with consequent slipping on the capstan and/or stretching of the tape.

SUMMARY OF THE INVENTION

In view of the foregoing, it is a general object of the invention to compensate for head-to-tape stick-slip action in magnetic tape transport apparatus of the turnaround type having a single, speed-regulated capstan for metering magnetic tape into and out of a magnetic transducer station. A more specific object of the invention is to provide apparatus of simple design and construction to compensate for stick-slip action in a way that is free from the effects of any difference between the respective diameters of the capstan and a turnaround roller.

These objects are achieved by providing a low-inertia motor having an output, coupled to the turnaround roller, for rotation therewith in accordance with the speed of the magnetic tape in the capstan loop. A motor-speed sensor, responsive to the output of the motor, produces a signal corresponding to the instantaneous speed of the motor and thereby the corresponding speed of the tape in the capstan loop. A phase lock loop, responsive to such signal, produces a composite control signal including a nominal component corresponding to a desired tape speed and an error component corresponding to tape flutter in the capstan loop. A bandpass filter, coupling the output of the phase lock loop and the low-inertia motor, causes the motor to adjust the speed of the turnaround roller in phase opposition to the error component, to thereby suppress flutter in the capstan tape loop.

A particular advantage of the invention is that tape flutter can be suppressed independently of any difference between the diameter of the capstan and the diameter of the turnaround roller, which is not the case with the prior art using separate motors, servo controlled from the same source, for respectively driving the capstan and turnaround roller. Thus, the adjusting of the speed of the turnaround roller would not affect the control of the capstan, which independently delivers flutter-free tape to the capstan tape loop.

The invention and its other advantages will become more apparent in the detailed description of a preferred embodiment presented below.

DESCRIPTION OF THE DRAWINGS

The invention will be described with reference to the accompanying drawings, wherein.

DETAILED DESCRIPTION OF A PREFERRED EMBODIMENT

Figure 1:
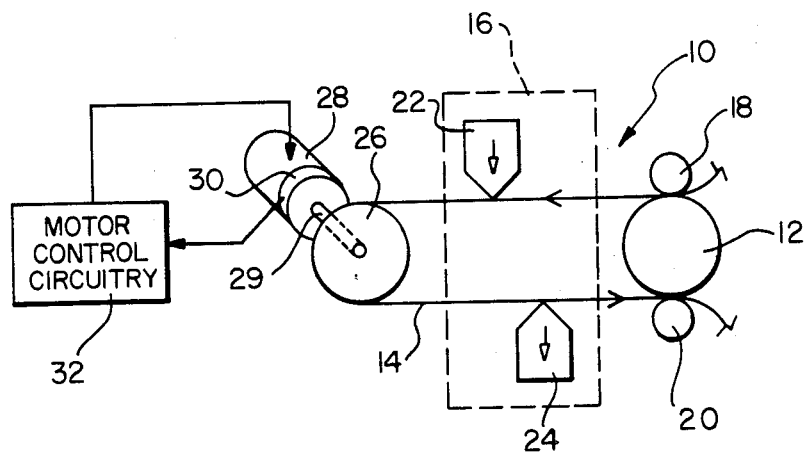
FIG. 1 shows a tape drive apparatus of the type having a single, speed-regulated capstan for metering magnetic tape into and out of a magnetic transducer station.

FIG. 1 illustrates a tape drive mechanism 10, known in the art, of the type having a single, speed-regulated capstan 12 for metering magnetic tape 14 into and out of a magnetic transducer station 16. Pinch rollers 18 and 20, together with the capstan 12, serve advantageously for tensioning the tape 14 in firm contact with a magnetic record head 22 and a magnetic playback head 24. A turnaround roller 26 functions to effect a change in the direction of the tape 14 through approximately 180 degrees.

As is known in the art, a differential velocity drive can serve advantageously to develop sufficient tape tension with each magnetic head. To that end, the tape-engaging surface of each of the pinch rollers can be arranged to cause a differential velocity favoring the center of the tape 14, to create a dynamic tension within the closed capstan tape loop.

As described hereinbefore, a problem exists in the art, however, with tape transport apparatus of this type in that a stick-slip action of the magnetic tape can occur as it passes over each magnetic head. Each of the two spans of flexible magnetic tape 14, between the transducer station 16 and the turnaround roller 26, act as a spring. The spring-like action of the tape, together with the inertia of the turnaround roller, constitute a resonant system. Head-to-tape friction causes tape drive variations which are excited by the resonant system to the point that tape flutter, in a range between approximately 350 to 400 hertz, occurs in the tape capstan loop. This frequency band is within the flutter compensation range required of a modern magnetic tape recorder.

To eliminate the adverse effects of tape-to-head stick-slip action, the invention requires means for monitoring tape drive variations within the tape capstan loop. To that end, the invention includes a compensating motor, designated 28, having an output shaft 29 connected to the turnaround roller 26 for rotation therewith. For a reason made apparent hereinbelow, the motor 28 is preferably of the low-power, low-inertia type.

For actually monitoring tape drive variations in the capstan loop, the motor 28 is equipped with a tachometer 30, which is preferably of the optical type. The tachometer 30 serves to produce a pulsed output signal, the frequency of which is related to the instantaneous speed of the shaft 29 of the motor 28. The frequency of pulses of the tachometer output corresponds, of course, to the speed of the turnaround roller 26 and thereby the speed of the tape 14 in the capstan loop. With a high speed tape recording operation, for example having a tape speed of approximately three meters/second, the tachometer 30 serves to produce an output signal having a carrier frequency on the order of 10,000 hertz. Any variation in the speed of the motor 28, and therefore the speed of the turnaround roller 26, however, for example due to change in a drag condition on the tape 14 as it is driven past a magnetic head, is seen in changing frequency of the pulses generated by the tachometer 30.

The invention also requires means for detecting and suppressing tape flutter in the capstan loop. To that end, the invention includes motor control circuitry 32, having an input, responsive to the tachometer output, and an output, coupled to the motor 28, for selectively driving the motor, to adjust the rate of rotation of the turnaround roller 26 in a manner that suppresses tape flutter.

Figure 2:
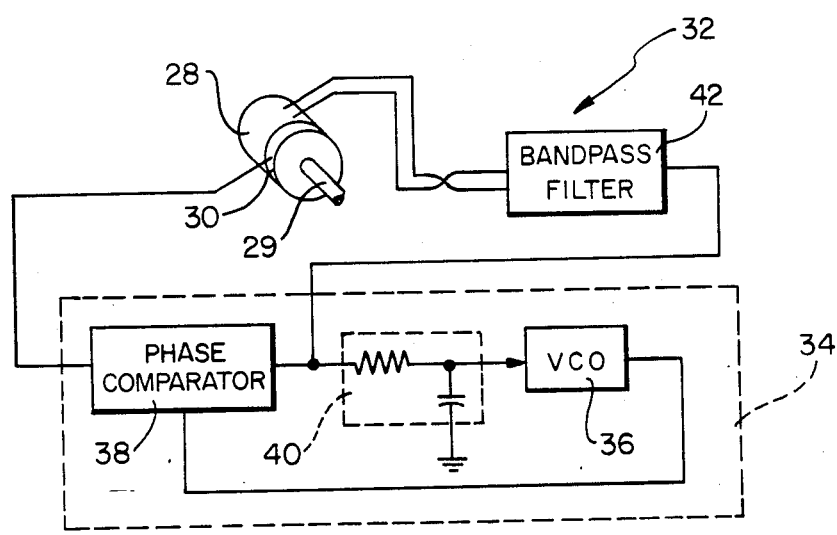
FIG. 2 is a schematic block diagram of motor control circuitry, in accordance with the invention, for regulating the speed of a turnaround roller of FIG. 1.

FIG. 2 shows the motor control circuitry 32 in greater detail. The circuitry 32 includes a phase lock loop 34, responsive to the output of the tachometer 30, that functions to produce a composite signal including (1) a nominal component corresponding to a desired average speed for the motor 28, and (2) an error component corresponding to unwanted tape flutter in the capstan loop.

For that purpose, the phase lock loop 34 includes a voltage controlled oscillator (VCO) 36 which functions to produce a pulsed, reference output signal having a carrier frequency corresponding to the nominal speed of the turnaround roller 26.

A phase comparator 38 serves to produce the aforementioned composite signal including the error component that is functionally related to unwanted transients in the capstan loop. To that end, the phase comparator 38 receives the reference VCO output and the output of the tachometer 30, and, in response thereto, produces a series of output pulses corresponding to the nominal speed of the motor 28 and thereby the speed of the roller 26; these pulses, however, are also modulated in width as a function of frequency variations in the tachometer output.

A lowpass filter 40 serves to provide an input voltage, for the VCO 36, that is linearly related to the average speed of the turnaround roller 26. To that end, the filter 40, by means of an upper-cutoff frequency of approximately 0.5 hertz, serves to smooth the output of the phase comparator 38, to thereby provide a relatively stable output voltage the amplitude of which corresponds to the average speed of the turnaround roller 26.

Thus, if the speed of the capstan 12 were to change, for example increases, the average speed of the turnaround roller 26 increases correspondingly, which increases the tachometer output frequency. This, in turn, increases the average output of the lowpass filter 40 which increases the frequency of the reference signal provided by the VCO 36. The speed of rotation of the roller 26, of course, may be greater than or less than the speed of the capstan, depending on the diameter of the roller relative to the diameter of the capstan.

A bandpass filter 42 serves to drive the low-inertia motor 28, to suppress the flutter component. To that end, the filter 42 has a bandpass corresponding to the anticipated range of flutter frequencies, i.e. approximately 300 to 400 hertz, but which is several octaves below the carrier frequency in the tachometer output. Thus, the filter 42 serves to suppress the higher carrier frequency, while passing the lower frequency flutter component to the motor 28. To suppress tape flutter in the capstan loop, the motor 28 receives the output of the filter 42 in phase to oppose oscillatory motion and, hence, in effect suppress tape flutter.

An uncorrected tape flutter of one percent (1%) at 350 hertz, with a tape speed of about three meters/second, represents an excursion of approximately 0.0625 mm. With a commonly employed turnaround transport system, the longitudinal stiffness of the two tape spans in the capstan loop corresponds to approximately 0.028 grams/centimeter. Accordingly, the torque requirement on the compensating motor 28 is approximately 0.28 gram-centimeter, plus its inertial load.

Figure 3:
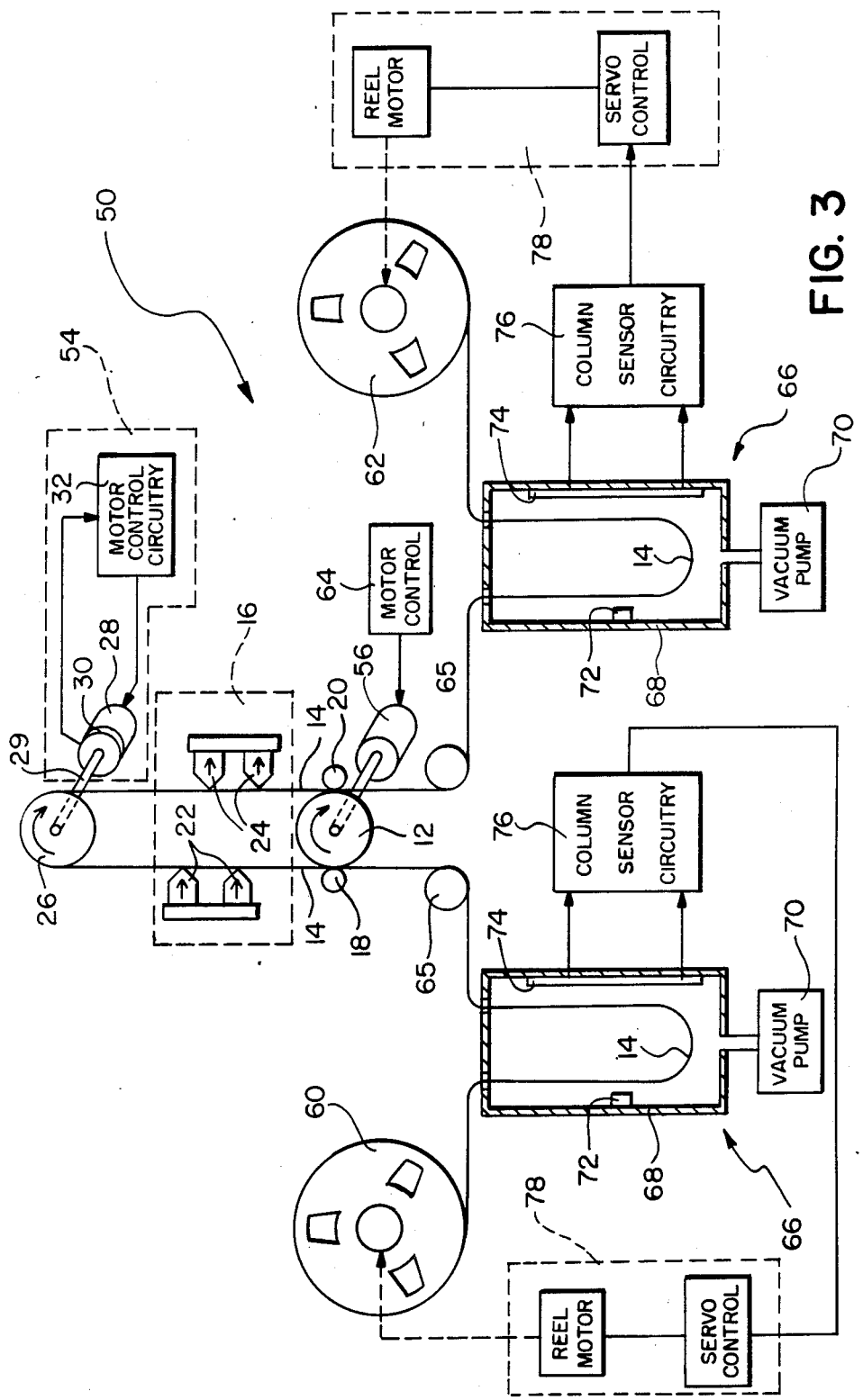
FIG. 3 shows a simplified schematic diagram of a symmetrical tape transport apparatus having a single capstan for metering tape into and out of a magnetic record/playback head station.

FIG. 3 shows a simplified schematic diagram of a symmetrical tape transport apparatus 50 of the tape including a single, speed-regulated capstan 12, for metering magnetic tape 14 into and out of a magnetic transducer station 16, and apparatus 54, in accordance with the invention, for regulating the turnaround roller 26, to compensate for head-to-tape stick-slip action. Elements of FIG. 3 which are common or substantially similar to elements of FIG. 1 are identified by like numerals.

A motor 56 serves to rotate the capstan 12 in the direction of the arrow 58 for advancing the tape 14 between a supply reel 60 and a take-up reel 62. As is well known in the tape transport art, a motor control 64 functions to drive the motor 56 at an appropriate rate, so that the capstan 12 can advance the tape 14 at a smooth, flutter-free speed relative to the transducer station 16. A pair of tape guide rollers 65, strategically placed at the entrance and exit points of the capstan area, serves to direct the tape 14 advancing from the supply reel 60 and toward the take-up reel 62.

Preferably a pair of vacuum column systems 66, coupled respectively to the supply reel 60 and to the take-up reel 62, serves to regulate the speed of the respective tape reels, to protect against uneven inertial loading caused by start/stop conditions and a variable tape pack diameter. For that purpose, each vacuum column system 66 includes a chamber 68, which serves as a buffer. To that end, a vacuum pump 70 functions to draw the tape 14 into the chamber 68 under the influence of vacuum.

Under normal operating conditions, the supply reel 60 passes tape 14 into the adjacent chamber 68 at a rate that maintains the size of the tape loop in the supply buffer constant. For that purpose, a light source 72, on one chamber wall, serves to activate a linear array 74 of photocells on the opposite wall. If the length of the tape loop within the chamber 68 changes—either increases or decreases—the light source 72 exposes a correspondingly fewer or greater number of photocells in the array 74. Column sensor circuitry 76, in response to the number of photocells exposed, supplies an output to a servomechanism 78, to correct the speed at which the reel 60 is supplying the tape 14.

In a similar manner, the vacuum column system 66, coupled to the take-up reel 62, corrects the rate at which the reel 62 is taking up the tape 14.

ADVANTAGEOUS TECHNICAL EFFECT

From the foregoing it is apparent that head-to-tape stick-slip action has been compensated for in magnetic tape transport apparatus of the turnaround type having a single, speed-regulated capstan for metering magnetic tape into and out of a magnetic transducer station. A particular advantage of magnetic tape transport apparatus, in accordance with the invention, is that the compensation for stick-slip action is accomplished in a way that is free from the effects of any difference between the respective diameter of the capstan and a turnaround roller.

The invention has been described in detail with reference to the figures, however, it will be appreciated that variations and modifications are possible within the spirit and scope of the invention.

What is claimed is:

1. In magnetic tape transport apparatus of the type having a turnaround roller arranged to effect a change in the direction of the magnetic tape through approximately a 180-degree reversal, and a speed-regulated capstan for metering the magnetic tape into and out of a magnetic transducer station interposed between said capstan and said turnaround roller, the improvement comprising:

(a) a motor having an output coupled to said turnaround roller, to regulate the speed of said turnaround roller, and thereby the speed of the tape in the loop between said capstan and said turnaround roller;

(b) motor-speed sensing means, responsive to the output of said motor, for producing an output signal corresponding to the instantaneous speed of said turnaround roller;

(c) a phase lock loop, responsive to the output signal of said motor-speed sensing means, for producing a composite control signal including a nominal component corresponding to a desired tape speed and an error component corresponding to flutter in the tape loop; and (d) a bandpass filter, coupling said phase lock loop and said motor and arranged for separating the error component from the nominal component, for adjusting the speed of said turnaround roller in phase opposition to the error component, to suppress flutter in the tape loop, whereby the tape is caused to move past said turnaround roller at the speed at which said capstan meters tape into and out of the transducer station.

2. Magnetic tape transport apparatus as claimed in claim 1 wherein said motor-speed sensing means comprises a tachometer.

3. Magnetic tape transport apparatus as claimed in claim 1 wherein said phase lock loop includes a lowpass filter arranged to smooth the composite control signal to produce a relatively stable output voltage corresponding to the average speed of said turnaround roller.

4. Magnetic tape transport apparatus as claimed in claim 3 wherein said phase lock loop further includes an oscillator, responsive to the output voltage of said lowpass filter, for producing a reference signal having a frequency corresponding to the average speed of said turnaround roller.

5. Magnetic tape transport apparatus as claimed in claim 1 wherein said bandpass filter has a bandwidth corresponding to the range of anticipated tape flutter frequencies.

6. Magnetic tape transport apparatus as claimed in claim 5 wherein the output signal of said motor-speed sensing means has a carrier frequency that is functionally related to the speed of said turnaround roller, and the bandwidth of said bandpass filter is several octaves below such carrier frequency.

* * * * *